Patented Nov. 16, 1948

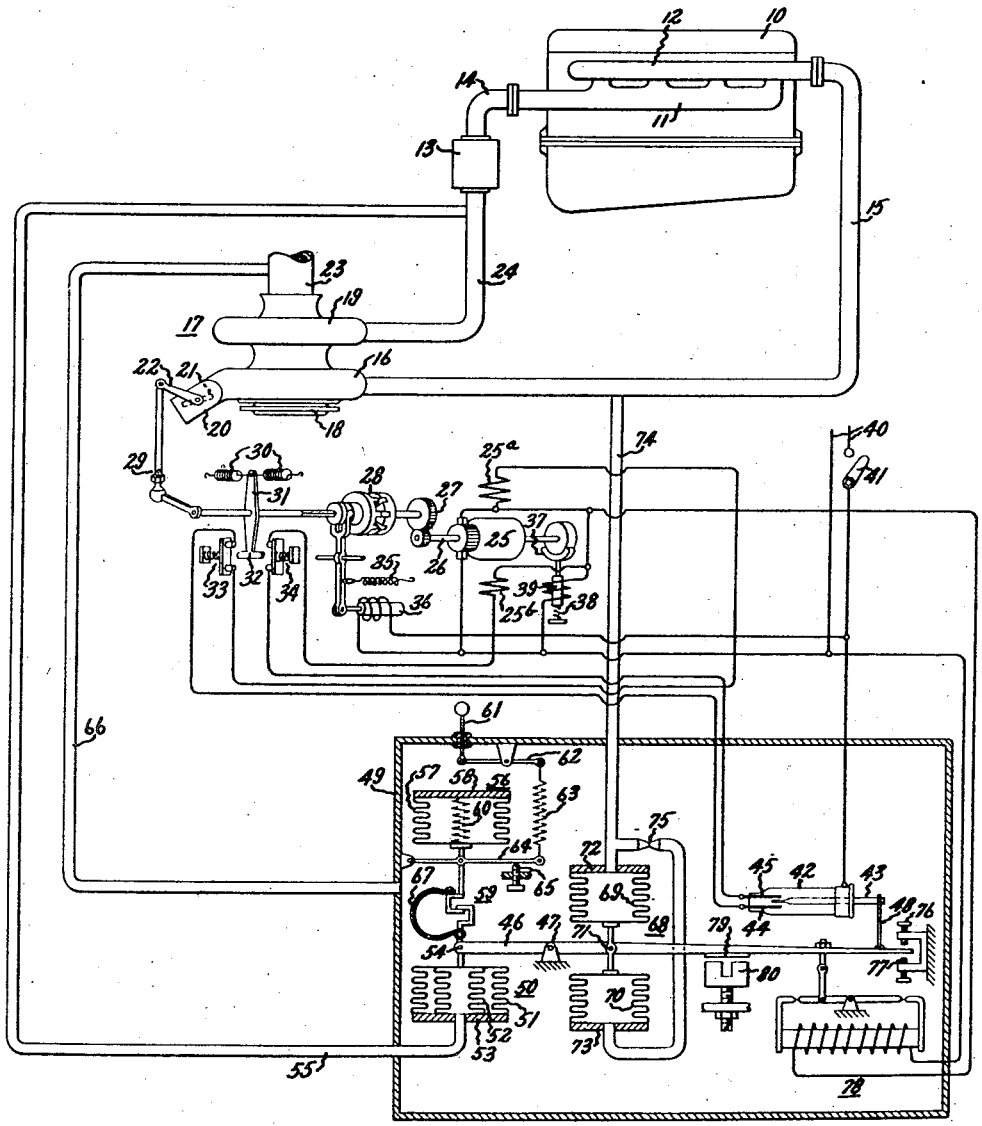

2,454,038

UNITED STATES PATENT OFFICE 2,454,038

CONTROL SYSTEM FOR AIRCRAFT TURBOSUPERCHARGERS

Frederick E. Crever, Scotia, N. Y., assignor to General Electric Company, a corporation of New York Application October 14, 1942, Serial No. 461,969

11 Claims. (Cl. 230—114)

My invention relates to a control system for aircraft turbosuperchargers and especially to control systems for turbosuperchargers wherein the turbosupercharger is operated by exhaust gases from an aircraft internal combustion engine and the air compressed by the turbosupercharger is used to supercharge the engine. Specifically, my invention is an improvement on the control system disclosed and claimed in the application of David R. Shoults, Serial No. 452,294, filed July 25, 1942, now matured into Patent No. 2,374,708 of May 1, 1945 and assigned to the same assignee as the present application.

An object of my invention is to provide a new and improved control system for turbosuperchargers for aircraft.

Another object of my invention is to provide regulating means for turbosuperchargers which maintain a constant inlet manifold pressure over a predetermined range of operation with great stability.

Still another object of my invention is to provide new and improved means for regulating a turbosupercharger in which constant inlet manifold pressure is maintained over a predetermined range of operation thereof and thereafter substantially constant turbosupercharger speed is maintained.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which the single figure thereof is a diagrammatic view of a turbosupercharger control system embodying my invention.

Referring now to the drawing, 10 indicates an aircraft internal combustion engine having an intake manifold 11 and an exhaust manifold 12. A carburetor 13 is schematically indicated as having its outlet connected to the intake manifold 11 by means of a conduit 14. Exhaust manifold 12 is connected by a conduit 15 to a nozzle box 16 of an exhaust gas-driven supercharger generally indicated at 17. The turbine wheel of the supercharger 17 is indicated at 18 and the compressor at 19. Connected with the nozzle box 16 is a waste conduit 20 in which is located an adjustable waste gate valve 21 used in regulating the turbosupercharger. On the shaft of gate valve 21 is fixed an arm 22 for use in positioning the valve.

Connected to the inlet of centrifugal compressor 19 is an intake conduit 23 for conveying air from the slip-steam of the aircraft to the compressor. To this end conduit 23 may be connected with a suitable ram, not shown, which faces into the slip-stream of the aircraft. The discharge side of compressor 19 is connected by a conduit 24 to the inlet of carburetor 13. If desired a suitable inter-cooler may be provided in conduit 24 to maintain the temperature of the air entering carburetor 13 within a predetermined range for best airplane performance.

The arrangement so far described is a known one and is to be taken as typical of any suitable turborsupercharger installation. In operation, exhaust gases from the aircraft engine are supplied through conduit 15 to the nozzle box 16 from which they are discharged through a ring of nozzles to the turbine wheel 18 of turbosupercharger 17 or, through waste conduit 20 directly to atmosphere. When waste gate valve 21 is wide open substantially all the exhaust gases discharge directly to atmosphere, little if any passing through the nozzles to the turbine wheel. This represents no load on the supercharger. As waste gate valve 21 is gradually closed pressure is built up in nozzle box 16 effecting a gradually increasing flow of exhaust gases through the nozzles to the turbine wheel to operate the supercharger. Maximum load on the supercharger is reached when waste gate valve 21 is fully closed so that all gases from the engine are discharged against the turbine wheel 18. Ordinarily, waste gate valve 21 is in an intermediate position, part of the exhaust gases being discharged to atmosphere and the remainder passing through the turbine wheel.

My invention has to do particularly with an improved means for regulating waste gate valve 21.

The position of waste gate valve 21 may be varied by any suitable motive means such, for example, as a hydraulic piston or the like. However, due to the very low temperatures encountered by high flying aircraft the oil used to operate a piston or similar motive means is likely to congeal and unsatisfactory operation result. Preferably therefore, I control the position of waste gate valve 21 through operation of motive means comprising an electric motor 25 of the split series field type having field windings 25a and 25b. Upon proper energization of motor 25 it will, as desired, rotate in either direction. The shaft 26 of motor 25 is connected through suitable gearing 27, a clutch 28 and a linkage mechanism generally indicated at 29 to arm 22 controlling the position of waste gate valve 21. Associated with the linkage mechanism indicated at 29 are centering springs 30 which maintain waste gate valve 21 in an intermediate position whenever the clutch 28 is disengaged. The centering springs 30 are associated with a lever 31 attached to the linkage mechanism 29. Lever 31 is provided with an extension 32 for engaging in either extreme position thereof with normally closed limit switches 33 and 34 connected in the energization circuits of motor 25, thereby to prevent over-travel of waste gate valve 21.

The clutch 28 is normally biased by spring means 35 to the disengaged position. However, a solenoid 36 is provided causing engagement of clutch 28, which solenoid is energized continuously except upon failure of electrical power supply, in which case the centering springs move waste gate valve 21 to an intermediate position.

In order accurately to control the operation of motor 25 with regard to waste gate valve 21, a suitable brake 37 is provided which is normally biased by spring means 38 to the engaged position and is electrically released by means of a solenoid 39 which is energized simultaneously with energization of motor 25.

In order to operate motor 25, solenoid operated brake 37 and solenoid controlled clutch 28 I provide a source of control potential generally indicated at 40 which is connected through a master control switch 41 to solenoid 36 and through master control switch 41 and automatically operable double-throw switch 42, specifically illustrated as a vacuum switch, to motor 25, and solenoid 39. Vacuum switch 42 is provided with a movable switching member 43 for completing the circuit between one terminal of source 40 and one or the other of a pair of stationary contacts 44 or 45. Contact 44 is connected through limit switch 33, series field 25a and motor 25 to parallel connected solenoid 39 of the brake associated with motor 25. Similarly, terminal 45 of vacuum switch 42 is connected through limit switch 34 and series field 25b and motor 25 to parallel connected solenoid 39 and the brake associated with motor 25. When waste gate valve 21 is regulated automatically by the regulator to be described hereinafter, master control switch 41 will be closed. If switching member 43 is now moved to engage contacts 44, series field 25a will be energized to cause rotation of motor 25 in such a direction as to move gate valve 21 in a closing direction. Conversely, if switching member 43 engages contact 45 series field 25b is energized to cause rotation of motor 25 in a direction to open waste gate valve 21. When switching member 43 is in an intermediate position engaging neither contacts 44 nor 45, motor 25 is deenergized and brake 37 prevents further rotation thereof.

The operation of motor 25 and consequently the position of gate valve 21 may be controlled, as will be obvious from the following description, in response to any control pressure appurtenant to an operating condition of the supercharger 17. As was mentioned above, however, over the normal operating range of the supercharger until a predetermined critical speed is reached, it is desirable to regulate the operation thereof to maintain constant the inlet manifold pressure of the aircraft engine associated with the supercharger. To this end I provide a pressure-responsive mechanism for operating switching member 43 of vacuum switch 42 in accordance with the particular control pressure or control condition appurtenant to the operation of turbosupercharger 17 which it is desired to maintain.

As shown in the drawing, I provide a pressure-responsive device which aids in regulating the discharge pressure of the turbosupercharger compressor to a value which is adjustable by the pilot until the critical speed of the turbosupercharger is reached, the speed being roughly proportional to the pressure ratio across the compressor thereof, and thereafter to regulate the speed based on this pressure ratio to limit the maximum speed of the turbosupercharger. This fluid pressure regulator comprises a movable control or regulating member 46 pivotally mounted at 47. Suitable controlling forces are applied to movable regulating member 46 as will be described hereinafter which controlling forces are transmitted to switching member 43 of vacuum switch 42 by means of a link 48 inter-connecting one end of member 46 with switching member 43. In order to amplify the movement produced by the control forces applied to regulating member 46 the control forces are applied to member 46 through fairly short lever arms as contrasted with the long lever arm for transmitting these forces to switching member 43. Preferably movable control member 46 and vacuum switch 42 are mounted within a fluid-tight enclosure or housing 49.

Mounted within fluid-tight housing 49 is a regulator member generally indicated at 50 which comprises an outer bellows member 51 and an inner bellows member 52 concentrically arranged with respect to one another. One adjacent end of each of bellows members 51 and 52 is connected to a stationary member 53 while the other ends are connected directly to movable regulating member 46 as indicated at 54 through a relatively short lever arm with reference to member 46. The interior of bellows 51 is evacuated while the interior of bellows 52 is connected directly to the control pressure which it is desired to regulate through conduit 55 which, as indicated in the drawing, is connected to the discharge of compressor 19 so as to regulate the compressor discharge pressure or, in other words, the intake manifold presure.

Also connected to movable regulating member 46 through the same lever arm as regulating member 50 is a second regulating member generally indicated at 56 which comprises a single bellows 57 having the same cross-sectional area as bellows 51. One end of bellows 57 is connected to a stationary member 58 while the other end thereof is connected through a disconnecting link 59 comprising a pair of hooked fingers, to point 54 on movable regulating member 46. Bellows 57 which is evacuated contains a compression spring 60. In order to make it possible to adjust the pressure to be regulated at the will of the pilot as long as the predetermined critical speed of the supercharger is not exceeded, I provide a manual adjustment lever 61 which is connected by lever 62, tension spring 63 and lever 64 to the free movable end of belows 57. If the pilot moves manual lever 61 to change the tension on spring 63 the pressure of the quantity which it is desired to regulate by the automatic regulator covered by my invention may be varied or adjusted. A suitable stop 65 is provided to limit the movement of bellows 57 and permit the disconnecting link 59 to be described hereinafter to function only when a certain predetermined operating characteristic of the turbosupercharger is attained.

In order to control movable regulating member 46 in response to the absolute compressor discharge pressure or intake manifold pressure during the range of operation below a predetermined maximum speed of turbosupercharger 17, I connect housing 49 with the compressor intake conduit 23 by means of a conduit 66 so that the interior of housing 49 is maintained at the compressor intake pressure. Since bellows 57 and 51 have the same cross-sectional area the forces exerted thereon by the compressor intake pressure are neutralized insofar as movable regulating member 46 is concerned and since bellows 51 is evacuated the only force acting on member 46 other than the substantially constant force of springs 60 and 63 is that transmitted by bellows 52 namely the absolute compressor discharge pressure or intake manifold pressure. This, of course, is only true as long as disconnecting link 59 is in engagement as indicated in the drawing. During such condition the following equation applies to the system:

$$P_i A_{57} - K_s = P_i A_{51} - P_o A_{52}$$

in which $P_i$ is the compressor inlet pressure, $P_o$ the compressor outlet pressure, $A_{57}$ is the area of bellows 57, $A_{51}$ is the area of bellows 51, $A_{52}$ is the area of bellows 52 and $K_s$ is the total spring force of the springs 60 and 63.

Omitting the function of a bimetallic strip, described below, a force is transmitted through the hooks of the connecting link 59 which is represented by the lefthand part of the equation, namely, $P_i A_{57} - K_s$. This force becomes zero when $P_i A_{57}$ is equal to $K_s$. When this takes place as will be readily seen from the above equation, the pressure ratio $$\frac{P_o}{P_i} \text{ is equal to } \frac{A_{51}}{A_{52}}$$

In other words, the hooks of the connecting link 59 become disengaged only at a predetermined ratio of the inlet and outlet pressures of the compressor. The bellows assembly 56 and the biasing spring 63 are so designed that when the aircraft is flying at a comparatively low altitude a quite appreciable upward force is exerted on the disconnecting link 59. Since at low altitude the compressor inlet pressure is comparatively high, this pressure communicated to the interior of the regulator casing 49 will cause the bellows assembly 50 to tend to collapse, thus providing the downward reaction on the link 59 needed to balance the above-mentioned upward force produced by the bellows assembly 56 and spring 63. Under such conditions, the pressures to which the bellows assemblies 56 and 50 are subjected cooperate to position the lever 46 in accordance with the value of the compressor discharge pressure communicated to the interior of bellows 52.

If now the aircraft should begin to climb, the bellows combination 50, 56 will act to maintain constant the compressor discharge pressure. However, the decreasing pressure inside casing 49 results in a decrease in the upward force exerted by bellows assembly 56 and spring 63 on the disconnecting link 59; while the increasing differential between the pressure inside of bellows 52 and that on the exterior of bellows 51 produces a corresponding decrease in the downward reaction force imposed on lever 46 by bellows assembly 50. As the altitude increases, the above-described decrease in the forces exerted on the disconnecting link 59 continues until a critical point is reached at which the hooks of the disconnecting link 59 just engage without any interchange of force.

If then the inlet pressure drops still further, the movable head of bellows assembly 56 will continue its downward movement and the head of bellows 50 its upward movement, thus producing disengagement of the hooked members comprising the disconnecting link 59. With the bellows assembly 56 thus rendered ineffective by reason of disengagement of the hooks 59, the lever 46 will be positioned by the bellows assembly 50 acting alone (not taking into account the action of the bimetallic thermal element 67 described below).

If constant compressor inlet temperature and constant fluid conditions of the supercharger obtain, the ratio of the compressor discharge pressure to the compressor inlet pressure is substantially proportional to the speed of the compressor. And even though the inlet temperature and pressure vary, this pressure ratio gives a fairly accurate measure of the speed of the turbosupercharger. When the speed of the turbosupercharger reaches a predetermined maximum, it is desirable to no longer try to maintain constant the intake manifold pressure of the engine but rather to maintain constant the speed of the supercharger at or below a predetermined maximum value. By suitably proportioning the areas of bellows 51, 52 and 57, a predetermined increase in the pressure ratio between the compressor discharge pressure and the compressor intake pressure due to the fact that the aircraft has reached an altitude at which the compressor intake pressure has fallen a predetermined amount will permit compression spring 60 to move the free end of bellows 57 downwardly so that lever 64 engages stop 65. Thereafter any increase in compressor discharge pressure will cause disconnecting link 59 to effectively disconnect the movable ends of bellows 51 and 57 so that thereafter only regulator 50 will be operably connected to regulating member 46. It should be understood, however, that disengagement of disconnecting link 59 is not limited to situations when lever 64 engages stop 65 but may be determined by the design of the bellows, springs, and related parts, as described above. Since control member 50 includes bellows 51 subjected to the compressor intake pressure and bellows 52 subjected to the compressor discharge pressure which act in opposition to each other, a force proportional to the ratio of the compressor discharge pressure to the compressor inlet pressure will be applied to member 46 or, in other words, a force substantially proportional to the speed of the turbosupercharger. By suitably proportioning the areas of bellows 51 and 52 the control of movable regulating member 46 may be accomplished to maintain a desired predetermined pressure ratio, and consequently a predetermined maximum speed.

Analysis and experience have shown that centrifugal compressor speed is not a fixed function of pressure ratio, the relation varying somewhat as a function of inlet temperature. In order that disconnecting link 59 may be operated more exactly in response to the attainment of a predetermined maximum speed of turbosupercharger 17, disconnecting link 59 is by-passed by a bimetallic temperature compensator illustrated as compensating strip or spring 67. As was pointed out above, the ratio of the compressor discharge pressure to the compressor inlet pressure would be a true measure of compressor speed under constant flow and constant inlet temperature conditions. The pressure responsive bellows 57, 51, 52 and the springs 60 and 63 and related parts are designed to give the desired operation with some selected compressor inlet temperature. If then, unless special compensating means are provided, the inlet temperature should vary appreciably from this design value, the speed maintained by the regulator would vary a prohibitive amount from the speed it is desired to hold. It may be noted that because of the severe operating conditions encountered in aircraft turbosuperchargers, a variation of 10 per cent from the desired speed might mean the difference between safe operation and disaster. The function of the bimetallic thermal element 67 is to introduce a modifying or compensating force which will substantially eliminate the effect of this variation in the speed versus pressure ratio relation as compressor inlet temperature changes. It should be noted that the regulator housing 49 will be located in the aircraft in a position where the entire casing and the elements contained therein will be subject to ambient altitude temperature. Thus the thermal element 67 will respond to changes in ambient altitude temperature, which is substantially the same as compressor inlet temperature.

In designing the bimetallic thermal element 67, it is necessary to first determine the variation of the relation between compressor pressure ratio and speed as the inlet temperature varies. Having given this information, it is possible by analysis and calculation, supported by tests, to design a bimetallic element which will produce the compensating force required to give a closely fixed relation between speed and compressor pressure ratio regardless of inlet temperature. The design will be such that with the "design temperature" for which the bellows and springs were calculated to give the desired effect, the compensating force exerted by the bimetallic element on the disconnecting link 59 is zero. With this temperature, the hooks of the disconnecting link will disengage at a predetermined pressure ratio corresponding to the maximum desired compressor speed. However as the inlet temperature varies from the design temperature, the disengagement of the hooks will take place at a pressure ratio which varies in the predetermined manner as a function of inlet temperature, so that the disengagement of the hooks always occurs at the preselected critical speed. Thus by the addition of the thermal compensating element 67, the bellows arrangement can be made to respond more exactly to the attainment of a preselected maximum compressor speed.

To stabilize the operation of the control mechanism I provide an anti-hunting device 68 comprising a pair of bellows 69 and 70, each having one end thereof, namely the movable end connected in opposed relationship to regulating member 46 at 71 through a relatively short lever arm, thereby to magnify the movement thereof at the end of member 46 which is connected to switching member 43 of vacuum switch 42. The other end of bellows 69 is connected to a stationary member 72. Similarly the other end of bellows 70 is connected to a stationary member 73. The interiors of bellows 69 and 70 are connected through conduit 74 with conduit 15 so as to be responsive to the exhaust manifold pressure. In order that the anti-hunting device 68 may operate in response to the rate of change of exhaust manifold pressure, I provide a restriction or orifice 75 between conduit 74 and the entrance to bellows 70. Under steady exhaust manifold pressure conditions the pressures in bellows 69 and 70 are equal and the force applied by anti-hunting device 68 to member 46 is zero. However, a change in exhaust manifold pressure will be immediately effective in creating a force against the movable end of bellows 69 which is connected to conduit 15 through a free passageway, whereas the change in force on the movable end of bellows 70 connected through the restriction 75 will be delayed, and consequently anti-hunting device 68 produces a force dependent upon the rate of change of exhaust manifold pressure. Due to the very rapid response of exhaust manifold pressure to a change in exhaust gate valve position, very stable operation of the regulator embodying my invention is obtained.

The travel of movable regulating arm or member 46 is limited by the stops 76 and 77. If desired, additional damping means may be provided for movable regulating arm 46 and as indicated in the drawing, I have provided an electrical damper generally indicated at 78, which is energized whenever motor 25 is energized. This damper, as will be obvious from the drawing, produces a force on movable member 46 tending to maintain it in an intermediate position.

Due to the fact that the bellows 51, 52, 57, 69 and 70 and springs 60 and 63 are connected to movable regulating member 46, a fairly high force must be applied to member 46 to obtain movement and it might be desirable to provide some means having a negative spring rate or constant for counteracting this effect whereby greater sensitivity of the device may be obtained. To this end I provide an armature 79 on movable regulating member 46 which is attracted by a suitable magnet 80 fixedly mounted in spaced relationship thereto.

The operation of the turbosupercharger regulator described above will be fairly obvious from the detailed description included above. Assume that the air craft is in the air and is flying at an altitude lower than the critical altitude of the supercharger, i. e., at an altitude below the maximum for which the supercharger is capable of maintaining, without excess speed, a predetermined pressure on the discharge side of the compressor, for example, sea-level pressure. Also assume that at such altitude waste gate valve 21 is in a partially closed position and the supercharger is operating at a speed such that the desired pressure obtains on the discharge side of compressor 19 of the supercharger 17. Under these conditions the compressor inlet pressure will be sufficiently high and the ratio of compressor discharge pressure to compressor inlet pressure will be such that disconnecting link 59 is in engagement as shown in the drawing. In this case movement of the free end of bellows 57 will cause movement of movable regulating member 46. Under these conditions, since the forces applied by bellows 51 and 57 to member 46 neutralize each other, member 46 will be operated in direct response to the absolute compressor discharge pressure, or in other words, the intake manifold pressure. If, now, the pressure on the discharge side of compressor 19 decreases, the end of lever 46 connected to bellows 51 and 52 will move downwardly and such movement will be transmitted to switching member 43 of vacuum switch 42 to engage contact 44, whereupon motor 25, series winding 25a and electrical damping means 78 are energized, brake 37 is released, and waste gate valve 21 is rotated in a closing direction to increase the speed of the supercharger and bring the compressor discharge pressure back to normal. It is assumed, of course, that master switch 41 is closed which would be the case when the regulator is operated. When switch 41 is closed, the winding of solenoid 36 is continuously energized to hold clutch 28 closed. On the other hand, if the pressure on the discharge side of compressor 19 increases, then the end of member 46 connected to bellows 51 and 52 will be moved upwardly and this motion will be amplified by lever 46 to cause switching member 43 of vacuum switch 42 to engage contact 45, whereupon series field 25b, motor 25, and solenoid 39 are energized as is also electrical damping means 78. With this energization of motor 25, waste gate valve 21 is rotated in an opening direction, whereby the speed of supercharger 17 is decreased to bring the compressor discharge pressure back to normal. Any change in the position of waste gate valve 21 will cause a very rapid change in the exhaust manifold gas pressure so that anti-hunting device 68 will apply force to member 46 in response to the rate of change of exhaust gas manifold pressure and consequently will cause very stable operation of movable regulating member 46. The size of the restricted opening 75 and the area of bellows 69 and 70 are so chosen as to give the needed counteracting or modifying effect to provide stable governing of the supercharger.

When the aircraft reaches the critical supercharger altitude, that is, the maximum altitude for which the supercharger is designed to maintain constant compressor discharge pressure without exceeding a predetermined maximum speed, the ratio between the compressor discharge pressure and the compressor inlet pressure will be such that the disconnecting link 59 functions so that bellows 57 no longer exerts a force on movable regulating member 46. This occurs whenever the compressor inlet pressure multiplied by the area of bellows 51 is less than the compressor discharge pressure multiplied by the area of bellows 52. This latter statement is true except as modified by the action of the bimetallic temperature compensator 67 connected across the disconnecting link. This bimetallic temperature compensator modifies the pressure ratio at which disconnection of link 59 occurs, in order to correct for the effect of inlet temperature on the relationship between turbosupercharger speed and the ratio of the compressor discharge and inlet pressures as described above. When the link 59 is disconnected regulator 50 controls movable regulating member 46 in accordance with the pressure ratio referred to above which is quite closely proportional to supercharger speed by virtue of bimetallic temperature compensator 67 assuming substantially constant fluid-flow conditions obtain. In other words, after the critical speed of the supercharger has been reached the regulating device of my invention will tend to maintain this speed constant by adjusting the waste gate valve 21 in the same manner that the device tends to maintain the compressor discharge pressure constant over a predetermined range of operation.

With the invention described above it is possible to obtain close automatic and stable regulation of a turbosupercharger with an improved apparatus that is very simple in construction and reliable in operation.

While I have shown and described a particular embodiment of my invention it will be apparent to those skilled in the art that my invention is not limited to the particular embodiment shown but that changes and modifications may be made without departing from the spirit and scope of my invention and I aim in the appended claims to cover all such changes and modifications.

What I claim as new and desire to secure by Letters Patent of the United States is:

1. In combination, a turbine driven compressor actuated by exhaust gases, valve means for regulating the flow of exhaust gases to the turbine, means responsive to the pressure of the air discharged from the compressor for positioning said valve means to maintain the pressure of the air from said compressor at a constant value over a predetermined range of operation, and means responsive to the rate of change of pressure of said exhaust gases in the turbine for modifying the effective action of said last mentioned means to prevent hunting.

2. In combination, a turbine driven compressor actuated by exhaust gases, valve means for regulating the flow of exhaust gases to the turbine, means responsive to the pressure of the air discharged from the compressor for positioning said valve means to maintain the pressure of the air discharged from said compressor at a constant value over a predetermined range of operation, and anti-hunting means for modifying the effective action of said last mentioned means in response to the rate of change of pressure of the exhaust gases in the turbine.

3. In combination, a turbine driven compressor actuated by exhaust gases, valve means for regulating the flow of exhaust gases to the turbine, means responsive to the discharge pressure of said compressor for automatically positioning said regulating means during a predetermined range of operation of said compressor, a disconnecting link arranged to function upon operation of said compressor outside said predetermined range of operation to cause control of the position of said valve means in response to the ratio of the discharge to the inlet pressure of said compressor, and means for modifying the effective action of said means responsive to the discharge pressure of said compressor in response to the rate of change of pressure of the exhaust gases so as to prevent hunting.

4. In combination, a turbine driven compressor actuated by exhaust gases, valve means for regulating the flow of exhaust gases to the turbine, an electric motor for positioning said valve means, a source of power for said electric motor, means responsive to a pressure which is a measure of an operating condition of said turbine driven compressor to be controlled for automatically controlling said electric motor and consequently positioning said valve means over a predetermined range of operation of said compressor, and means responsive to failure of source of power for causing said valve means to assume an intermediate position.

5. The combination with a turbosupercharger comprising a gas driven turbine, a compressor driven from the turbine, an electric motor and a power supply therefor, and valve means for regulating the supply of gas to the turbosupercharger, of a control mechanism for said valve means comprising a movable regulating member for controlling the energization of said electric motor connected to position said valve means, means for subjecting said regulating member to a force responsive to the discharge pressure of said compressor, means for subjecting said regulating member throughout a predetermined range of operation of said turbosupercharger to equal and opposite forces responsive to the inlet pressure of said compressor, means for rendering one of said last mentioned forces ineffective with respect to said regulating member when a predetermined ratio of compressor discharge to compressor inlet pressure obtains and means for positioning said valve means in an intermediate position upon failure of said power supply for said electric motor.

6. In a regulator the combination of a control lever, a first evacuated bellows assembly subjected externally to a first variable pressure and connected to the control lever by a disconnecting link arranged so that said first bellows can exert a force in one direction only on the lever, a second evacuated bellows subjected externally to the first pressure and connected to the control lever, and a third bellows within the second evacuated bellows subjected internally to a second variable pressure and connected to the control lever, the bellows assemblies and the disconnecting link being so constructed and arranged that when the ratio of the second to the first pressure is below a critical value all three bellows cooperate to position the lever in accordance with the value of the second pressure, while when said ratio is above the critical value the disconnecting link renders the first bellows ineffective.

7. In a regulator the combination of a control lever, a first evacuated bellows assembly subjected externally to a first variable pressure and connected to the control lever by a disconnecting link arranged so that said first bellows can exert a force in one direction only on the lever, a second evacuated bellows subjected externally to the first pressure and connected to the control lever, a third bellows within the second evacuated bellows subjected internally to a second variable pressure and connected to the control lever, the bellows assemblies and the disconnecting link being so constructed and arranged that when the ratio of the second to the first pressure is below a critical value all three bellows cooperate to position the lever in accordance with the value of the second pressure while when said ratio is above the critical value the disconnecting link renders the first bellows ineffective, and a thermal device responsive to a temperature condition connected to the lever and the first bellows in parallel with the disconnecting link and arranged to alter as a function of said temperature condition the value of pressure ratio at which the first bellows becomes ineffective.

8. In combination with a centrifugal compressor driven by a gas turbine with means for controlling the pressure of motive fluid supplied to the turbine, a regulator for said control means including a control lever, a first device responsive to compressor pressure ratio connected to the lever, a second device including an evacuated bellows subjected on its exterior surface to compressor inlet pressure and spring means arranged to act on the lever through a connection capable of transmitting force to the lever in one direction only, the first and second devices being arranged to cooperatively position the lever in accordance with the value of compressor discharge pressure for all values of compressor pressure ratio up to a predetermined maximum value and the one-way connection being arranged to render the second device ineffective when the pressure ratio reaches the predetermined maximum so that the lever is positioned by the first device to maintain the pressure ratio constant at said maximum value, and anti-hunting means responsive to the rate of change in pressure of the turbine motive fluid connected to the lever to stabilize the action of the first and second devices.

9. In combination with a motor driven centrifugal compressor having means for controlling the compressor speed, a regulator for said control means including a control lever, a first device responsive to compressor pressure ratio connected to the lever, a second device including an evacuated bellows subjected on its exterior surface to compressor inlet pressure and spring means arranged to act on the lever through a connection capable of transmitting force to the lever in one direction only, the first and second devices being arranged to cooperatively position the lever in accordance with the value of compressor discharge pressure for all values of compressor pressure ratio up to a predetermined maximum value and the one-way connection being arranged to render the second device ineffective when the pressure ratio reaches the predetermined maximum so that the lever is positioned by the first device to maintain the pressure ratio constant at said maximum value.

10. In combination with a motor driven centrifugal compressor having means for controlling the compressor speed, a regulator for said control means including a control lever, a first device responsive to compressor pressure ratio connected to the lever, a second device including an evacuated bellows subjected on its exterior surface to compressor inlet pressure and spring means arranged to act on the lever through a connection capable of transmitting force to the lever in one direction only, and a thermal device connected to the second device and to the lever in parallel with the one-way connection, the first and second devices being arranged to cooperatively position the lever in accordance with the value of compressor discharge pressure for all values of compressor pressure ratio up to a predetermined maximum value, and the one-way connection and the thermal device being arranged to render the second device inoperative when the pressure ratio reaches a maximum value corresponding to a preselected maximum speed of the compressor.

11. Apparatus for controlling the pressure of the air supplied to the intake manifold of an internal combustion engine provided with a turbine-driven compressor for supplying air to said intake manifold and powered by exhaust gases from said engine, comprising in combination, means for controlling the pressure of said exhaust gases to control the speed of said turbine and compressor, motor means for driving said pressure controlling means, a device responsive to the pressure of the air supplied by said compressor, means including said device for controlling said motor means to maintain said intake manifold pressure substantially constant, a device responsive to the rate of change of the pressure of said exhaust gases, means including said last-mentioned device for additionally controlling said motor means to limit the acceleration of said turbine.

FREDERICK E. CREVER.

REFERENCES CITED

The following references are of record in the file of this patent:

UNITED STATES PATENTS

| Number | Name | Date |
|---|---|---|
| 1,346,563 | Sherbondy | July 13, 1920 |
| 1,346,564 | Sherbondy | July 13, 1920 |
| 1,508,707 | Moss | Sept. 16, 1924 |
| 1,508,731 | Standerwick | Sept. 16, 1924 |
| 1,557,793 | Berger et al. | Oct. 20, 1925 |
| 2,283,175 | Berger | May 19, 1942 |

FOREIGN PATENTS

| Number | Country | Date |
|---|---|---|
| 479,278 | Great Britain | Jan. 28, 1938 |